Jan. 29, 1924.  
G. A. McDERMOTT  
1,481,968  
TRANSMISSION BAND, PULLER, AND HOLDER THEREFOR  
Filed July 11, 1922  
4 Sheets-Sheet 1
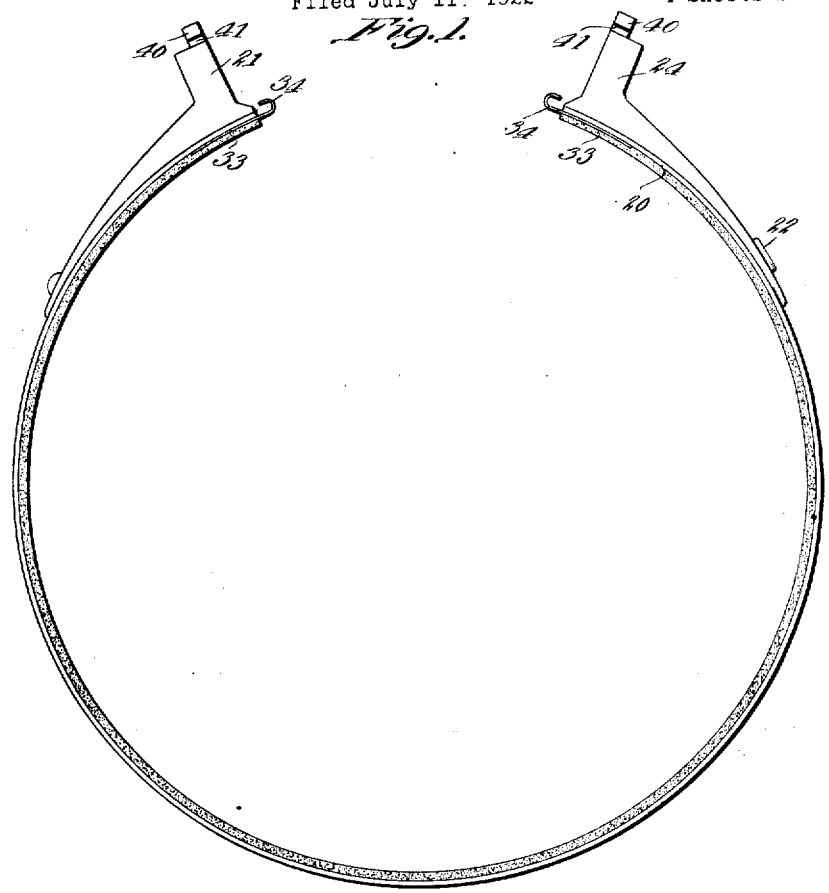
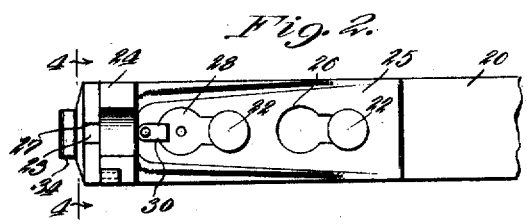
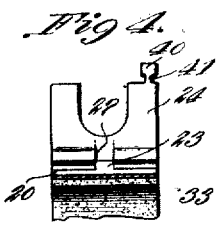
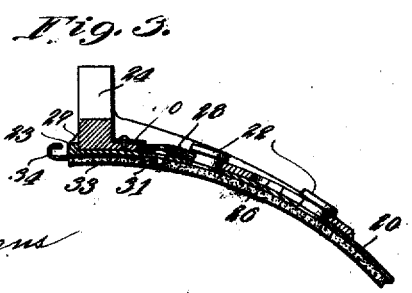
G. A. McDermott  
INVENTOR  
BY Victor J. Evans  
ATTORNEY
WITNESS:

Jan. 29, 1924. 1,481,968
G. A. McDERMOTT
TRANSMISSION BAND, PULLER, AND HOLDER THEREFOR
Filed July 11, 1922 4 Sheets-Sheet 2
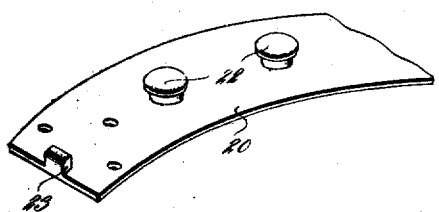
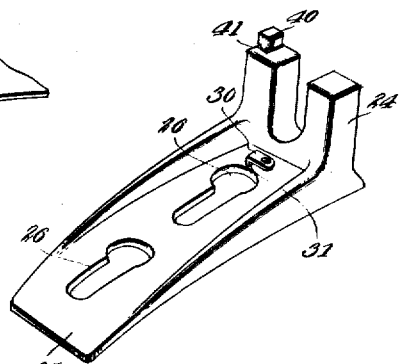
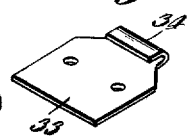
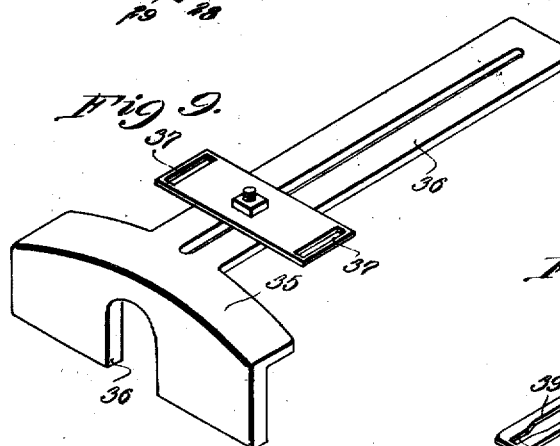
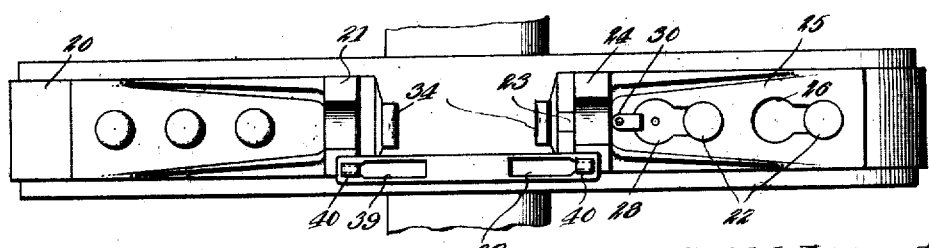

Jan. 29, 1924.  1,481,968
G. A. McDERMOTT
TRANSMISSION BAND, PULLER, AND HOLDER THEREFOR
Filed July 11, 1922  4 Sheets-Sheet 3

Jan. 29, 1924.
G. A. McDERMOTT
1,481,968

TRANSMISSION BAND, PULLER, AND HOLDER THEREFOR

Filed July 11. 1922
4 Sheets-Sheet 4

Patented Jan. 29, 1924.

1,481,968

UNITED STATES PATENT OFFICE.

GARRETT A. McDERMOTT, OF SAN DIEGO, CALIFORNIA.

TRANSMISSION BAND, PULLER, AND HOLDER THEREFOR.

Application filed July 11, 1922. Serial No. 574,165.

*To all whom it may concern:*

Be it known that I, GARRETT A. McDERMOTT, a citizen of the United States, residing at San Diego, in the county of San Diego and State of California, have invented new and useful Improvements in Transmission Bands, Pullers, and Holders Therefor, of which the following is a specification.

This invention relates to transmission bands for use on automobiles and has for its object the provision of a transmission band having a detachable ear whereby the band may be placed in or removed from encircling relation to its drum without necessitating removal of the transmission cover, the device having a distinct advantage in saving several hours' time in the operation of replacing worn bands.

I am aware that there are in existence several patented bands, some of which have both ears detachable and others of which have one ear detachable. A well known band of this latter mentioned type has a detachable ear provided on its underside with projections fitting within one or more holes formed in the band. The objection to this device is that in order to engage or disengage the ear the band and ear must be sprung apart which is difficult in the small space in which the work is to be done. Furthermore, this type of band has to be forced down on the left-hand side of the transmission in order that the end having the detachable ear may come around on the right hand side where there is more space to place the ear in position. This putting in and pulling out of the bands from the left side of the transmission bends the bands out of shape as the turn is very sharp. If the bands are forced around from the right hand side where the turn is not so sharp, then the ear cannot be placed in position as there is not sufficient room at the left side of the transmission to effect the necessary springing.

It is with the above objections in view that the present invention has been designed which contemplates in detail the provision of a detachable ear which has keyhole slots engageable upon headed fasteners projecting from the band whereby the above mentioned objectionable springing action will be unnecessary, an additional feature of my invention being the provision of a lock disposable within one of the key-hole slots subsequent to the engagement of the latter upon the headed fastener or stud so that longitudinal or circumferential displacement of the ear with respect to the band will be prevented.

Another, and a very important, object is the provision of a puller adapted to be engaged upon one of the driving plate screws which hold the brake drum and engageable with a hook at the end of the band whereby when a rear wheel of the automobile is jacked up and turned to turn the drums the band will be drawn around into proper position after which the puller is of course removed.

Another object is the provision of a holding device engageable with lugs formed on the ears whereby to hold the band contracted while proper adjustment of the pedal shafts is made.

Another object is the provision of a detachable notch member associated with the low speed shaft whereby this member may be removed to permit removal of the low speed shaft so that the same will not be in the way when putting in a new band on the low speed drum.

An additional object is the provision of band apparatus of this character which will be simple and inexpensive in construction, easy to use, a great time and labor saver, and a general improvement in the art.

With the above and other objects and advantages in view, the invention consists in the details of construction to be hereinafter more fully described and claimed and illustrated in the accompanying drawings in which—

Figure 1 is an edge elevation of my improved band,

Figure 2 is a plan view of the end having the detachable ear and showing the ear locked in place.

Figure 3 is a longitudinal sectional view through this end,

Figure 4 is a cross sectional view on the line 4—4 of Figure 2,

Figure 5 is a perspective view of this end of the band with the ear removed,

Figure 6 is a perspective view of the ear detached,

Figure 7 is a perspective view of the locking member detached,

Figure 8 is a perspective view of one of the hook members detached,

Figure 9 is a perspective view of the puller,

Figure 16 is a fragmentary plan view of the transmission with a band held contracted by my holder, Figure 17 is a detail perspective view of the holder alone.

Figure 10:
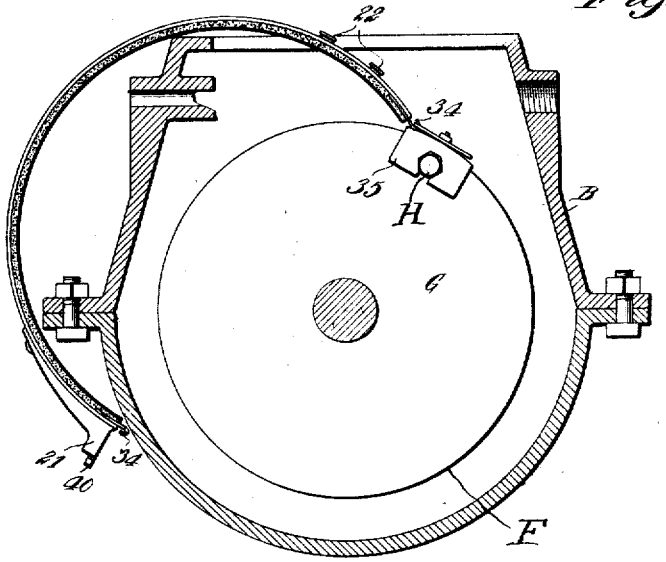
Figure 10 is a cross sectional view through the transmission of an automobile showing the band in initial position and engaged by the puller, with the low speed shaft removed.

Referring more particularly to the drawings, the letter A designates the transmission case of an automobile, B designates the transmission cover having the small door opening C. D designates the lower speed drum, E the low drum band contracting shaft, F the brake drum, G the driving plate, and H one of the driving plate screws.

As is well known in the art, the drums above mentioned, as well as the reverse drum, are encircled by contractile steel spring bands lined with brake fabric and provided at their ends with ears by means of which the bands may be contracted to make the various drums perform their functions. In the standard equipment of an automobile having this transmission, the ears are rigid with respect to the bands and ordinarily the low speed shaft E carries a notch member rigidly secured thereto.

In carrying out my invention I make use of a spring steel band 20 which has secured upon one end an ear 21 of the same type as is ordinarily provided. The other end of the band carries a pair of spaced headed studs 22 and is provided at its end with a projection 23. Associated with this second mentioned end of the band is a detachable ear 24 of the same shape as is ordinarily provided but having its base portion 25 formed with keyhole slots 26 engageable upon the studs 22 whereby the ear may be easily attached or detached. At its forked end the ear 24 is formed with a recess 27 engaging the projection 23 for relieving the strain upon the studs when the band is contracted by pressure upon the associated foot pedal.

In order to lock the ear 24 against possible movement circumferentially of the band, I provide a filler block 28 insertable within the keyhole slot 26 nearest the forked end of the ear and this filler block fits conformingly within this slot and has a concaved end 29 engaging the associated stud. Pivoted upon the top of the base portion 25 immediately adjacent the forked portion of the ear is a retaining catch 30 which has a down turned end 31 fitting within a depression 32 in the filler block. When this filler block is in position and engaged by the catch 30 it will be apparent that movement of the ear away from the end of the band will be positively prevented.

It is apparent that the above described band may be used in exactly the same manner as any other band having a single detachable ear but it will be noted that owing to the fact that the projections or studs are carried by the band, instead of the ear and that the ear is provided with the slots engaging the studs, that no springing action is necessary such as is described in the preliminary remarks.

As stated in said remarks there is more or less difficulty in inserting any band through the door opening at the top of the transmission cover. To render this operation more simple I provide the ends of the band with plates 33 riveted in place and formed with hooks 34 projecting beyond the ends of the band. I also make use of the pulling device which comprises a member formed as an arcuate body 35 having a slot 36 engageable upon one of the driving plate screws H after the latter has of course been loosened and secured with respect to the driving plate by subsequent tightening of the screw. Formed on this member 35 is an extension or arm 36 overlying the brake drum F and carrying pivotally mounted loops 37.

Figure 18:
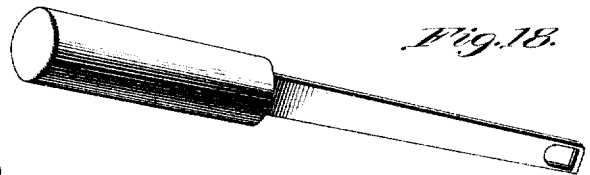
Figure 18 is a perspective view of another pulling tool used.
Figure 11:
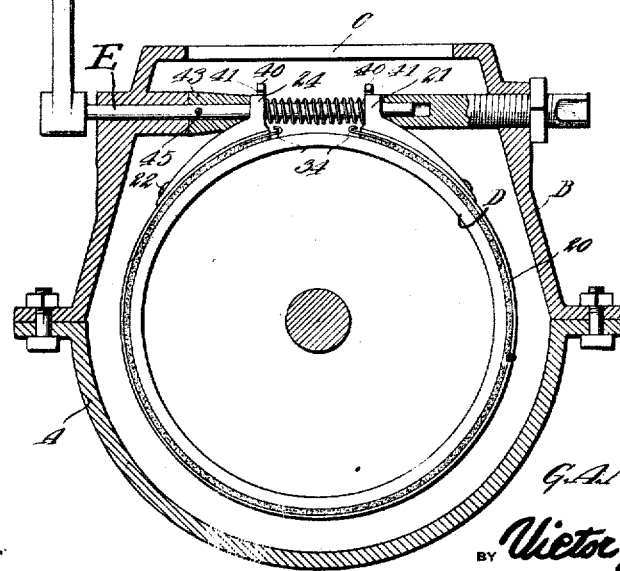
Figure 11 is a similar view showing the parts moved with the band in proper position and showing the low speed shaft in position.
Figure 12:
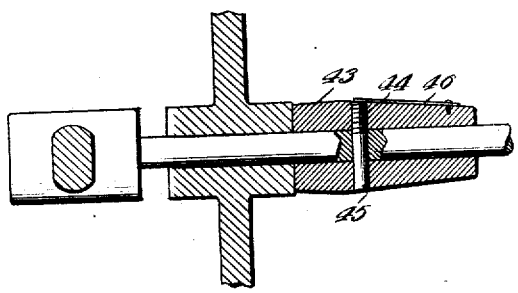
Figure 12 is a cross sectional view through a portion of the transmission cover, showing in section the detachable notched member for the low speed shaft.
Figure 13:
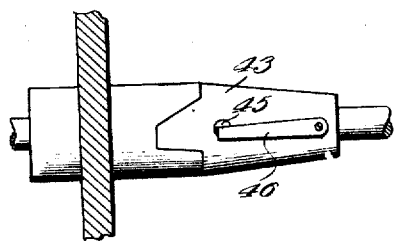
Figure 13 is a plan view of the low speed shaft and adjacent parts with the detachable member in locked position.
Figure 14:
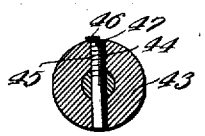
Figure 14 is a cross sectional view through the detachable notched member.
Figure 15:
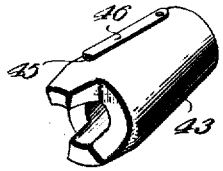
Figure 15 is a perspective view of the notched member removed.

In the operation of placing the band in position, the end from which the removable ear has been detached is inserted at the right hand side of the transmission, that is between the periphery of the brake drum and the cover. The puller having been placed in position upon the driving plate, as above described, one of the loops 37 thereon is engaged with a hook 34 at this end of the band. The operator then jacks up one rear wheel of the automobile and turns the wheel in the proper direction to rotate the transmission drums in a clockwise direction whereupon the rotation of the driving plate carrying the puller will cause the band to be drawn partly around its drum. When the drum is turned to the right as far as it will go there is not room enough to place the removable ear in position owing to the bearing of the pedal shaft. As a consequence the band is unhooked at the left hand side and, I engage thereon the handle member shown in Figure 18 and then pull the hand back toward the rear of the car while at the same time keeping a strain upon it. Each successive band is of course pulled back a less distance. When both ends are at the top in proper position the pedal shaft is engaged with the fixed ear 21. The detachable ear 24 is then engaged with the band, after which the adjusting nut on the pedal shaft is properly adjusted.

This adjustment of the pedal shaft, regardless of whether it be the one associated with the brake, low speed, or reverse pedal, is greatly simplified by the use of the holding member shown in Figures 16 and 17. This member comprises an elongated strip 38 of sheet metal formed at its end portions with slots 39 engageable over upstanding lugs 40 carried by both the ears 21 and 24. These lugs 40 have reduced necks 41 and the outer ends of the slots 39 are constricted, as shown at 42, for engagement with these necks so that when the band has been contracted to its maximum extent and the holding strip engaged upon them and then the band is permitted to expand until the lugs 40 are engaged within the outermost ends 42 of the slots, accidental displacement of the holding strip will be positively prevented. After this strip has been placed in position and the necessary adjustment of the nut of the associated shaft has been made, the associated pedal is pressed to again contract the band so that the holding strip 38 may be removed.

It is well known that replacing the low speed band is difficult owing to the front construction of the low speed shaft which cannot be removed, the brake and reverse shafts being of course easily removable. Ordinarily there is a notch member which is rigidly secured on the low speed shaft by a transverse rivet.

In order to obviate this objection I remove the ordinary notch member and replace it with a detachable notch member 43 which is provided with diametrically rounded threaded holes 44 which are brought into registration with the usual hole in the low speed shaft. A screw 45 is passed through registering holes and screwed home and turned into such position that the slot therein will be parallel with the axis of the shaft. To prevent accidental working out of this screw I provide a leaf spring 46 pivoted upon the member 43 and having at its end portion a down-turned flange or lip 47 engaging within the slot of the screw.

When it is desired to replace the low speed band the adjusting nuts are of course removed or loosened, the spring 46 is disengaged from the screw 45 and the latter is then removed, whereupon the low speed shaft may be withdrawn in exactly the same manner as the brake and reverse shafts. After the band is replaced this notch member 43 must of course be placed back in position with the screw 45 passing through the shaft and with the spring 46 engaging the screw.

It is well known that it is dangerous to use small articles around the transmission for fear of dropping them into the transmission which might result in necessitating removal of the entire motor. It is therefore advisable that the retaining member 38 and the filler block 28 be provided with holes 48 through which pieces of string may be tied so that they may be recovered if dropped. Any of the other parts may also be so equipped if found advisable.

From the foregoing description and a study of the drawings it will be apparent that I have thus provided an improved transmission band and means for placing and holding the same in position upon the transmission drums without in any way necessitating removal of the transmission cover, all parts of my invention being simple and inexpensive and their use in combination effecting a manifest saving in time and labor in the installation of such bands.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A transmission band provided at one end with a rigid ear and carrying at its other end spaced headed studs, a detachable ear associated with said second mentioned end and having a base portion formed with key-hole slots engaging upon said headed studs, a filler block disposable within one of said key-hole slots subsequent to the engagement of the slots upon said studs, and means for locking said filler block in position.

2. A transmission band provided at one end with a rigid ear and carrying at its other end spaced headed studs, a detachable ear associated with said second mentioned end and having a base portion formed with key-hole slots engaging upon said headed studs, a filler block disposable within one of said key-hole slots subsequent to the engagement of the slots upon said studs, and means for locking said filler block in position comprising a spring catch pivoted upon said base portion and having a down turned lip at its free end, the filler block being provided with a recess receiving said lip.

3. A transmission band having one end provided with a rigid ear and having its other end provided with a detachable ear, hooks extending from the ends of the band, in combination with a puller formed as a body adapted to be secured upon a portion of the planetary transmission of an automobile, and means carried by said puller and engageable with either of said hooks whereby the band may be moved about the transmission.

4. In a planetary transmission for automobiles including a series of drums and a driving plate bolted to one endmost drum, a transmission band provided at one end with a rigid ear and having at its other end a detachable ear, hook plates secured upon the band and extending beyond the ends thereof, in combination with a puller formed as a member adapted to be secured upon the driving plate by one of the bolts holding the latter, an arm on said member overlying the adjacent drum, and loop members carried by the arm and engageable with either of said hooks whereby upon rotation of the drums and driving plate the band will be moved into or out of encircling relation to said endmost drum.

5. A transmission band provided at its ends with ears, an upstanding lug formed on each ear and having a constricted neck portion, and means for holding the band contracted comprising an elongated strip slotted for engagement upon said lugs.

6. A transmission band provided at its ends with ears, an upstanding lug formed on each ear and having a constricted end portion, and means for holding the band contracted comprising an elongated strip slotted for engagement upon said lugs, the outer ends of the slot being constricted for engagement with the constricted portions of said lugs.

In testimony whereof I affix my signature.

GARRETT A. McDERMOTT.